UNITED STATES PATENT OFFICE.

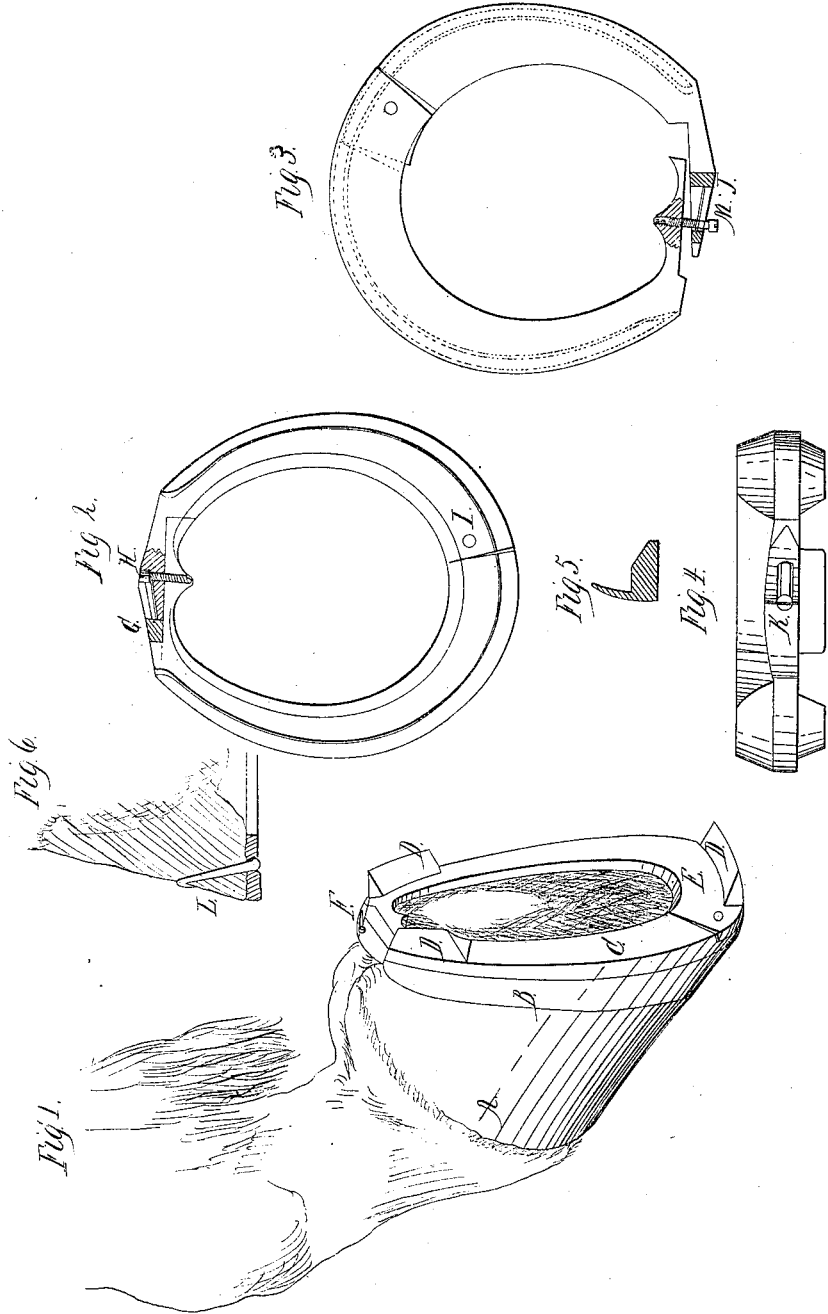

NELSON B. CARPENTER, OF NEW YORK, N. Y.

IMPROVED HORSESHOE.

Specification forming part of Letters Patent No. 14,852, dated May 13, 1856.

*To all whom it may concern:*

Be it known that I, NELSON B. CARPENTER, of the city, county, and State of New York, have invented a new and improved mode of forming, constructing, and fastening, or "setting" a horseshoe to the foot of a horse without the use of nails or the puncture of the hoof of the foot in any manner for the purpose of fastening the shoe; and I do hereby declare that the following is a full and exact description thereof, reference being had to the accompanying drawings, and to the letters of reference marked thereon.

The nature of my invention consists in the form, shape, and construction of a horseshoe which, when made, may be fastened to the foot of a horse without the use of a nail or nails, or any other similar device whatever which may in any wise puncture the hoof of the foot for the purpose of fastening the same.

To enable others skilled in the art to make and use my invention, I will proceed to describe its construction and operation.

I construct a horseshoe in the usual circular form and various sizes, of any suitable metal (wrought or malleable iron is preferred) for general use.

The main object of this invention consists in so forming and constructing a horseshoe that it may be secured to the foot without the use of nails, screws, or other similar device penetrating the hoof for the purpose of fastening the shoe, and at the same time thereby preserve the hoof from mutilation and other difficulties consequent thereon, and also preserve the foot in its natural shape and form. It is well known by those persons who have become conversant with the use of that valuable animal (and his nature) that the foot in its natural form is almost invariably round or of a circular form and not an oblong, as a large majority assume, after being "shod" a few years in the usual way. The operation being performed by unskillful mechanics, it therefore often occurs that the shoe is so formed that the size or shape does not correspond with the size and shape of the foot, and thus secured to the foot with nails, and not unfrequently there is an inequality of the surfaces of the foot and shoe, and thus by the tension of the nails the shoe is secured to the foot by a great pressure, and at the same time material injury may be committed to the foot by the wrong direction of the nails, thereby producing lameness caused by inflammation, mutilation of the hoof, and eventually a permanent deformity of the foot; and hence the many deformed and misshapen horses' feet which are constantly witnessed. There are also many other injurious effects produced by the present mode which might be adduced, but may be more particularly explained by reference being had to the specification defining and explaining this invention, and by the drawings annexed.

Figure 1 represents a perspective view of the foot of the horse having a shoe attached made in accordance to this invention, as represented by Figs. 2 and 3. Letter B represents the knife-edged flange or spline, forming a projecting cup-formed rim extending around the circular part of the shoe, projecting upward and around the hoof, which, being inclined inwardly at an angle from twenty-five to forty-five degrees in proportion to the angle required to correspond with the angle of the foot to which it is intended to be attached, and thus by the conical form of the hoof and corresponding form of the rim of the shoe, by which it is held to the foot, as shown by Fig. 2, (and more fully explained hereinafter.)

Fig. 2 represents the top view of the shoe closed as when fitted to the foot and secured by a screw or other similar device, as shown in the cross-bars G H.

Fig. 3 is also an upper view of the same shoe by opening the joint I. J and M represent two bars, (being a part of the shoe,) which, when closed, are secured to each other by a screw or its equivalent, as shown by Fig. 2, and in the particular manner as shown by Fig. 4, letter K. When opened or expanded, the shoe is placed on the hoof, and it is then compressed until the rim compresses the outer surface of the hoof, and then the screw is inserted—"drove" to the required compression—and by which the shoe is held firmly to the foot, as shown by letter F, but more distinctly by Fig. 4, letter K, which represents a rear sectional view as when closed and secured to the foot. K represents the outer portion of the double cross-bar, having therein a slotted hole. The outer side of this and the one half of the thickness of this outer bar of the slot is made of the width of the diameter of the head of the screw, and the other half of the width of the thickness of the body of the screw. Thereby the head of the screw is secured from mutilation or being exposed to any outward wear or mutilation.

Fig. 5 represents a sectional view of the shoe as formed with its projecting flange or spline.

Fig. 6, letter L, represents a sectional view of hoof, showing the relative position of a nail as perforating the hoof for the purpose of securing the shoe to the foot in the usual way. D D D represent the calks which may be secured to the shoe in various ways: first, by being welded in the usual way; second, by the means of screws or rivets passing through both shoe and the calk; third, by having calks made with projecting pins being part of the calk, which pins passing through the shoe and riveted upon the upper side of the shoe. E represents the joint by which the shoe is made to expand or contract, as before described.

This invention is not only intended as a preventive of various injuries and consequent damage to the foot of the horse by the usual mode now adopted, particularly when performed by unskillful mechanics, producing almost universally a deformity of the hoof and the consequent evils by driving the nails in the wrong direction—"pricking," cracked hoofs, thrush, &c.—but when such and other diseases of the foot do exist by the application of this invention they are more readily cured, as it will be seen that the outer surface of the hoof is protected and supported, while the foot rests upon the shoe as nature appears to have designed, and also, however much the foot may have become deformed and mutilated, it will also be seen that by a continual application of this shoe the hoof is again restored to its natural form and roundness when the hoof shall have been fully renewed by its natural growth; and it will also be seen that this plan of shoeing readily admits of a layer of india-rubber or other flexible substances to be placed under and around the foot within the shoe, making the same around the hoof air-tight, and at the same time prevent the jar or the concussion when traveling upon pavements, &c., which is painful to the animal and injurious to the foot.

Having thus described the nature, operation, and practical effect produced by my invention, I wish to be understood that I do not claim any particular construction or form of a horseshoe with a rim or flange, although the latter is in fact a part inseparately connected with my invention, yet I am aware that flanges or rims detached in part have been used heretofore in this and other countries. Neither do I claim a "heel-bar" or "round shoe," separately considered, as that, too, has been used heretofore; but

What I do claim as my invention, and desire to secure by Letters Patent, is—

A horseshoe having a branch bar attached to each heel-bar of the shoe, extending inwardly, and at the same time lapping and fitting one to the other, with corresponding apertures through each for the insertion of a pin or screw, for the purpose and in the manner herein set forth.

NELSON B. CARPENTER.

Witnesses:
SAM. C. HICKEY,
S. T. STEVENS.